Dec. 20, 1955      E. STUMP      2,727,692
HEATING UNIT FOR MOTOR VEHICLES
Filed July 18, 1951
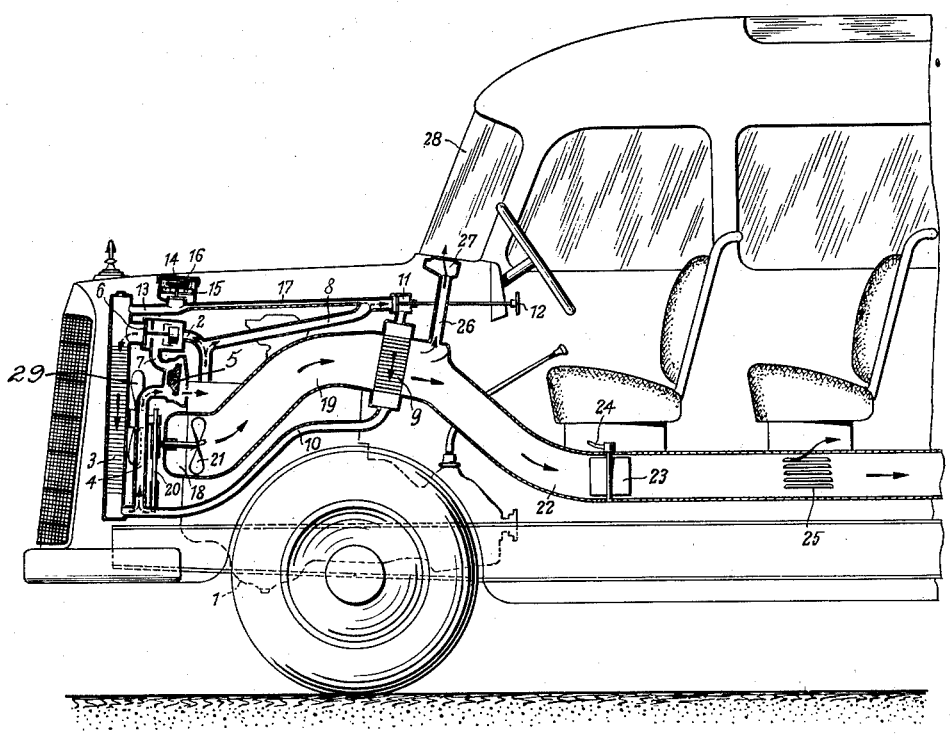
Inventor
Eugen Stump
By
Austin, Micke, Wilhelm and Padlon
Attorneys

United States Patent Office 2,727,692
Patented Dec. 20, 1955

2,727,692

HEATING UNIT FOR MOTOR VEHICLES

Eugen Stump, Stuttgart-Unterturkheim, Germany, assignor to Daimler-Benz Aktiengesellschaft, Stuttgart-Unterturkheim, Germany Application July 18, 1951, Serial No. 237,399

Claims priority, application Germany July 19, 1950

6 Claims. (Cl. 237—8)

The present invention relates to an air-conditioning unit, more particularly to a heating unit for motor vehicles.

It is an object of the present invention to construct such a unit, which is particularly effective and reliable in operation.

It is a further object of the present invention to achieve this effectiveness and reliability in operation with the simplest possible means.

It is a further object of the invention to spare the electric unit of the vehicle as much as possible and to save electric current.

Another object of the present invention refers to a cooling liquid circulation system, which is particularly suitable to serve for utilization of the waste heat of the engine for heating purposes.

The known ventilators for conveying heating air are ordinarily driven electrically. However, they heavily load the electric system which apart from being strained very much may easily contribute to troubles in operation, since the electric system in itself is relatively sensitive to interference.

In contradistinction thereto a characteristic of the present invention consists in providing a mechanical drive of such a conveying device, particularly for the conveyance of fresh air for heating purposes. It has the advantage of a simple type of drive, which is insensitive to troubles and which may also be controlled without difficulty by drivers, whose standard of training is not very high, and which furthermore does not require the electric energy of the vehicle, which is necessary for other purposes.

The conveying device, for example, a ventilator or blower, may furthermore be constructed essentially stronger and more effective than is possible with electric drives.

The change of air, which may be achieved provides also for large buses, excellent ventilating and heating, so that even if the bus is fully occupied the air is always fresh and pure, on the one hand, and on the other hand during the winter the panes do not become fogged up or only slightly so. At the same time the ventilation produces excess pressure in the interior of the vehicle. It is therefore free of draft and odors, and dust cannot penetrate into the interior of the vehicle.

Further objects and characteristics of the present invention will become more obvious from the following description of a preferred example of construction when taken with the accompanying drawing, which shows in its single figure one preferred embodiment for purposes of illustration only, and wherein:

The single figure shows a longitudinal sectional view through the front part of a motor vehicle, such as, for example, a bus.

From the water jacket of the driving engine 1 of the vehicle the mentioned cooling liquid or coolant, such as water, is conducted through a pipe 2 to the main cooler 3, from which the recooled cooling liquid is conveyed back over a pipe 4 to the driving engine 1 by the cooling water pipe 5. In the pipe 2 there is a thermostatically controlled valve 6, which releases the flow of the cooling liquid to the main cooler 3 at operating temperature of the cooling water, but at low temperature shuts off the flow to the cooler 3 in part or entirely and thereby forces the cooling liquid to flow back directly to the cooling water pump 5 over the short-circuit pipe 7, which by-passes the cooler 3. In other words, the control valve 6, which is thermostatically-controlled, controls the flow of the cooling liquid either through the radiator 3 or through the by-pass 7, depending on the temperature of the cooling liquid.

From the pipe 2 a shunt pipe 8 branches off, which leads to a heat exchanger 9, from which the cooling liquid flows back to the return pipe 4 of the cooling water circulation system over a pipe 10. In the shunt pipes 8 and 10, which includes the heat exchanger 9, a regulating valve 11 is arranged, which may for example, be operated from the instrument board by means of a handle 12. A pressure holding valve 14 is connected to the space above the cooler 3 by means of a pipe 13 of a relatively wide cross section, which consists of the two single valves 15 and 16, which are each under spring pressure, of which the valve 15 opens outwardly and the valve 16 opens inwardly. By appropriate dimensioning of the springs a certain pressure may be preserved in the cooling water system. The heat exchanger 9 is furthermore connected with the valve 14 through a narrow pipe 17, through which, on the one hand, an equalization of pressure between cooler and heat exchanger and, on the other hand, ventilation also of the shunt pipe 8 is made feasible.

The fresh air enters, for example through a channel 18, laterally by-passing the cooler 3, or also directly from the space behind the cooler into the fresh air pipe 19, in which a ventilator 21, which is driven mechanically by the motor, for example, by means of belt transmission 20, is arranged and conveys the fresh air in the direction of the arrow. It is for example arranged at the side or in the rear of the cooling ventilator 29, which may also be driven mechanically, for example by means of the same belt transmission 20 as the ventilator 23.

Behind heat exchanger 9 in the heating pipe 22, which leads to the rear, a regulating flap 23 is arranged, which may be adjusted from the driver's seat by means of a handle 24. This flap can be constructed as a simple throttle flap or also as a change-over device, i. e. in such a manner that the fresh air is guided either to the exit points 25 for the fresh air, which lead into the interior of the car body or directly into the open air.

The openings 25 may also be lockable or adjustable. To the pipe 22 furthermore a branch pipe 26 is connected, which leads to the defroster nozzles 27 for the windshield 28. In the pipe 26 furthermore provision may be made for a shutoff device. In accordance with the present invention described above mainly the following regulation possibilities may be obtained:

(1) Ventilation of the interior of the car:

The valve 11 is closed, the cooling water executes simply its normal circulation through the cooler 3 or the short-circuit pipe 7. The fresh air, which is conveyed by the ventilator 21, is therefore not heated during its passage through the heat exchanger 9 and may through the openings 25 enter the interior of the car body for airing or also occasionally to be led off to the outside.

(2) Heating of the interior of the car:

The valve 11 is opened, a part of the cooling liquid flows through the heat exchanger 9, which thereby serves simultaneously as an additional cooler for the main cooler 3. In the heat exchanger 9 an appropriate part of the cooling water heat is radiated or transferred to the fresh air, which flows through the pipe 19, 22 and which is thereby with opened regulating flap guided as heating air to the interior of the vehicle over the openings 25.

(3) Additional cooling for the driving engine:

This condition is provided, when in case (2) the heating air is guided instead of into the interior of the vehicle into the open air at 23 or eventually at the end of the pipe. The heat exchanger has to fulfill thereby only or mainly the function of a cooler for the cooling liquid.

Occasionally a part of the heating air may be guided over 26, 27 for defrosting of the windshield or also for other purposes. The fresh air, which serves as heating air, may be taken out in front or in the rear of the cooler, in front or in the rear of the cooler valve.

Through adjustment of the valve 11 or of the regulating flap 23 into any intermediate position furthermore a heating or ventilation of adjustable intensity may be achieved. Eventually also both valve 11 and regulating flap 23 may be closed simultaneously. Also the drive of the ventilator 21 may be adjustable or disconnectible, for example through changing of the drive transmission or of the wing position.

The arrangement of the heat exchanger in a pipe which is in parallel with the cooler—as well as occasionally with a short-circuit pipe, which is controlled by a thermostat and which by-passes the cooler—results furthermore in the advantage that both in the cooler and in the heat exchanger the full rate of decrease in temperature is at the complete disposal, so that a particularly effective heat exchange takes place in both aggregates. The heat exchanger, which is provided for the heating, acts thereby simultaneously as additional cooler for the driving engine. It may furthermore be switched off without difficulties from the cooling water cycle without preventing thereby the circulation of the cooling liquid through the cooler.

By directing the heating air to the foot space of the vehicle a particularly advantageous and agreeable heating effect is achieved. The invention is of particular importance especially for passenger vehicles with large space like buses or the like, but may naturally also be utilized for other vehicles.

What I claim is:

1. Heating unit for motor vehicles, comprising a vehicle driving engine, a fluid-medium cooling system for said engine including a first series circuit means having a cooler, a short-circuit means in parallel with said cooler for by-passing said cooler, thermostatically controlled valve means in said first circuit means for alternately connecting said cooler and said short circuit means in said first series circuit means, a forced draft heating system for said vehicle including a heat exchanger, a second series circuit means in said cooling system connected in parallel with said first series circuit means ahead of said valve means, said second series circuit means being independent of said valve means and including said heat exchanger, regulating valve means connected only in said second series circuit, and conveyor means in said cooling system for said cooling medium common to both said first and second series circuit means.

2. Heating unit according to claim 1 wherein said forced-draft heating system includes a blower means mechanically linked and directly driven by said engine.

3. Heating unit according to claim 2 further comprising pressure holding valve means, and separate means for connecting said pressure holding valve means with said first circuit means and with said second circuit means.

4. Heating unit according to claim 3 wherein said separate connecting means terminate in said cooler and in said second circuit means ahead of said regulating valve means respectively, said separate connecting means being of different cross sectional areas.

5. Heating unit for motor vehicles comprising a vehicle driving engine, a radiator located forwardly of said engine, a first cooling-liquid circuit including said radiator in series therewith, a heating system extending forwardly of said engine and rearwardly thereof into the interior of said vehicle including a heat exchanger located rearwardly of said engine, a second cooling-liquid circuit including said heat exchanger in series therewith, and second cooling-liquid circuit being in parallel with said first cooling-liquid circuit, a pump located adjacent the front end of said engine for said cooling liquid common to both said first and said second cooling-liquid circuit, blower means located in said heating system adjacent the front end of said engine, a mechanical connection for driving said blower means by said engine, a by-pass circuit in parallel with said radiator intermediate said radiator and said engine, thermostatically controlled valve means in only said first cooling-liquid circuit for alternately connecting said radiator and said by-pass circuit in series with said first cooling-liquid circuit, a pressure holding valve means located at the highest point of the cooling system, and separate connecting means of different cross sectional areas lying above said engine for connecting said pressure holding valve means with said radiator and with said second cooling-liquid circuit ahead of said heat exchanger.

6. Heating unit according to claim 5 further comprising a control valve for said second cooling liquid circuit located intermediate the interconnection thereof with one of said separate connecting means and said heat exchanger.

References Cited in the file of this patent

UNITED STATES PATENTS

| | | |
|---|---|---|
| 1,937,514 | Foutz | Dec. 5, 1933 |
| 1,978,892 | Bolkcom | Oct. 30, 1934 |
| 2,020,747 | Warren | Nov. 12, 1935 |
| 2,071,659 | Rose | Feb. 23, 1937 |
| 2,086,442 | Rushmore | July 6, 1937 |
| 2,159,599 | Morrison | May 23, 1939 |
| 2,277,568 | Tavernese | Mar. 24, 1942 |
| 2,277,814 | Booth | Mar. 31, 1942 |
| 2,383,640 | Findley | Aug. 28, 1945 |
| 2,445,392 | Findley | July 20, 1948 |
| 2,480,986 | Walker | Sept. 6, 1949 |